Feb. 27, 1968   J. L. BURGOON   3,370,864
ADJUSTABLE QUICK-ACTING CLAMP
Filed March 7, 1966
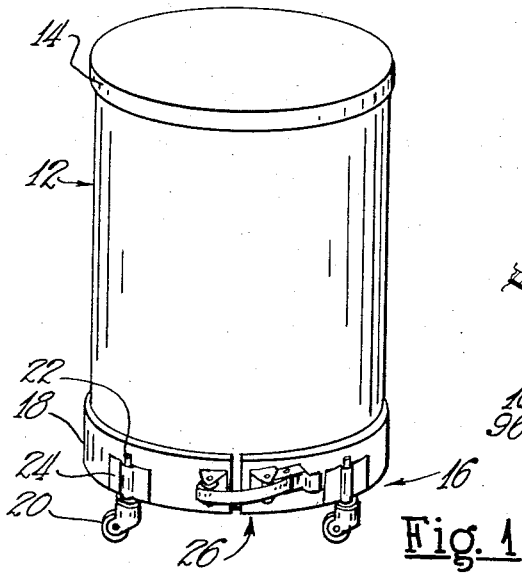
Fig. 1
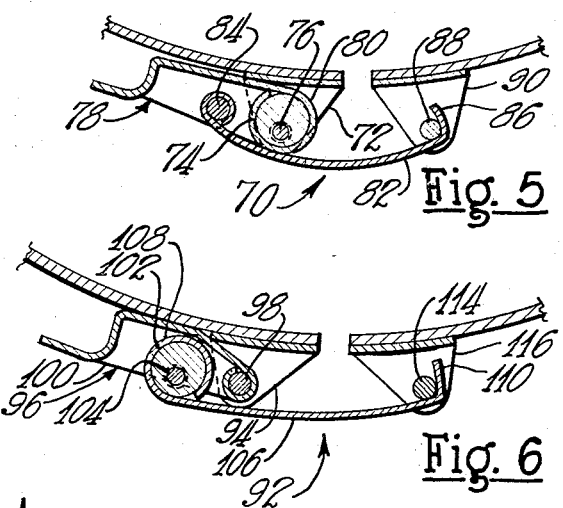
Fig. 5
Fig. 6
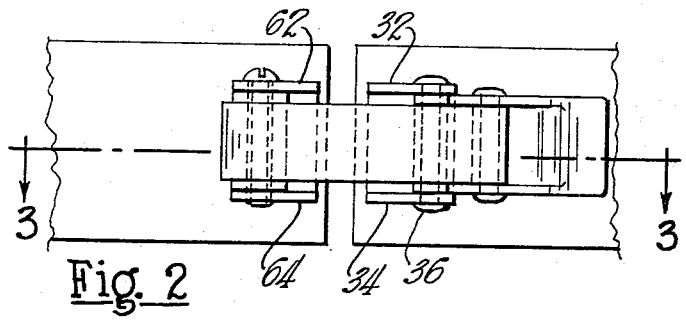
Fig. 2
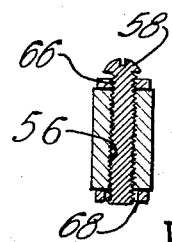
Fig. 4
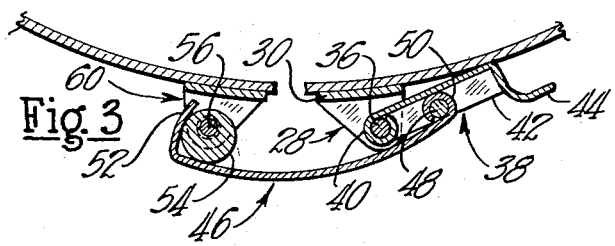
Fig. 3
INVENTOR.
JACK L. BURGOON
BY
Over + Over
ATTORNEYS

United States Patent Office 3,370,864
Patented Feb. 27, 1968

3,370,864
ADJUSTABLE QUICK-ACTING CLAMP
Jack L. Burgoon, Toledo, Ohio, assignor to American-Lincoln Corporation, Toledo, Ohio, a corporation of Ohio
Filed Mar. 7, 1966, Ser. No. 532,382
9 Claims. (Cl. 280—79.2)

This invention relates to an adjustable quick-acting clamp and more particularly to such a clamp for assembling a dolly band with a vacuum cleaner tank.

An adjustable quick-acting clamp in accordance with the invention is particularly suited for clamping bands around objects which are of a nominal size but which, in fact, vary slightly from one object to the next. A specific example of this is in a vacuum cleaner of the industrial type which has a large cylindrical vacuum tank which is moved around on a dolly. When the tank is to be emptied, it is separated from the dolly for ease in handling and is then again mounted on the dolly after being emptied. Vacuum cleaner tanks of this type are of a given nominal diameter but vary slightly from one tank to another due to slight variations in the manufacturing process. The bands of the dollies on which the casters are pivotally mounted, however, are of a relatively constant size or, if they vary, do so independently of the diameter of the tanks.

With a clamp in accordance with the invention, a simple means for varying the distance between the clamping parts is provided which effectively compensates for variation in the tank diameter or band length. The clamp includes an eccentric roller or cam which is rotatably mounted on one clamping part and can be turned relative to the other clamping part to vary the effective clamping distance between the two. In a preferred form, the roller is mounted by means of a threaded fastener in a manner such that the roller can be automatically adjusted and tightened at the same time. Once the eccentric roller is tightened in the proper position, no additional adjustment is ordinarily needed during subsequent use of the vacuum cleaner.

It is, therefore, a principal object of the invention to provide an adjustable quick-acting clamp.

Another object of the invention is to provide an adjustable quick-acting clamp for a band which is to encircle a member, the size of which member is subject to variation.

A further object of the invention is to provide an adjustable quick-acting clamp for a dolly of a vacuum cleaner tank, the circumference of which is subject to variation.

Many other objects and advantages of the invention will be apparent from the following detailed description of preferred embodiments thereof, reference being made to the accompanying drawings, in which:

FIG. 1 is a view in perspective of a vacuum cleaner tank and dolly attached to the tank with the aid of quick-acting clamp embodying the invention;

FIG. 2 is an enlarged, fragmentary view in elevation of the clamp of FIG. 1;

FIG. 3 is a view in horizontal cross section taken along the line 3—3 of FIG. 2;

FIG. 4 is a view in vertical cross section taken through an eccentric roller or cam of the clamp of FIGS. 2 and 3;

FIG. 5 is a view similar to FIG. 3 of a slightly modified quick-acting clamp; and FIG. 6 is another view similar to FIG. 3 of another slightly modified quick-acting clamp in accordance with the invention.

Referring to the drawings, and more particularly to FIG. 1, a vacuum cleaner tank 12 of generally cylindrical configuration, with a lid 14, is mounted on a dolly 16, whereby the tank can be easily transported during cleaning operations. The vacuum cleaner shown generally is of the industrial type and has a motor, blower, and hose (not shown) mounted in the usual manner on the lid 14. From time to time, the tank 12 must be emptied and to do so, the lid 14 is first removed, along with the motor, blower, and hose. When the tank 12 is emptied, it is also desirable to remove the dolly 16 to reduce the weight of the tank and the size when the tank is manually inverted and emptied.

The dolly 16 includes a mounting band 18 on which are rotatably mounted several casters 20 having pivot shafts 22 rotatably carried by suitable straps 24. The straps 24 also have flanges (not shown) which extend inwardly under the lower edge of the band 18 and engage the bottom of the tank 12 to prevent it from slipping through the band 18.

The band 18 is affixed to the tank 12 by means of a quick-acting clamp 26 which is shown slightly enlarged in FIG. 1 for clarity of illustration. The tank 12 is subjected to small variations in diameter and circumference when manufactured. This does not affect the operation of the tank in any manner but can affect the cooperation between the band 18 and the tank, particularly since the band 18 and clamp 26 might vary slightly from dolly to dolly, with this variation being entirely independent of the variation of diameter of the tank 12. Consequently, with the usual clamping arrangement, a band which would fit properly with one tank would be too loose or too tight for another tank and thus be unsuitable. Other, relatively expensive clamping arrangements have heretofore been employed to overcome this problem.

The quick-acting clamp 26 in accordance with the invention is provided with means by which variations in the diameter of the tank 12 or the length of the band 18 can be readily compensated. Referring particularly to FIGS. 2 and 3, the clamp 26 includes a first mounting bracket 28 which has a web 30 suitably fastened to an end portion of the band 18, as by spot welding, and a pair of outwardly extending ears or flanges 32 and 34. A lever pivot pin such as a rivet 36 extends through the ears 32 and 34 and carries an over-the-center lever 38. The lever 38 has a rolled portion forming a sleeve 40 extending around the pivot pin 36 and also has a U-shaped shank 42 terminating in a handle 44.

An engageable member or hook 46 is pivotally connected to side flanges of the U-shaped shank 42 by a pivot pin 48, the hook having a rolled portion forming a sleeve 50 around the pin 48. In this manner, the hook member 46 can pivot relative to the lever 38 when the lever is moved around the pivot pin 36. The hook member 46 has a hook 52 at the outer end which engages an engageable pin 54, which, in this instance, is in the form of an eccentric roller. The roller 54 has a threaded eccentric passage 56 through which a threaded fastener or screw 58 extends. The screw 58 is carried by a second mounting bracket 60 having a pair of ears or flanges 62 and 64. The screw 58 extends through a threaded hole 66 in the upper ear 62 and is received in a slightly larger, non-threaded hole 68 in the lower ear 64. This particular arrangement for mounting the eccentric roller or cam 54 relative to the bracket 60 enables the roller to be tightened and the clamp 26 to be adjusted at the same time. To accomplish this, the roller is mounted relative to the bracket by threading the screw through the opening 66 and the threaded passage 56 in the roller 54 until the screw is slightly snug, with the thick portion of the roller extending outwardly (assuming right-hand threads), as shown in FIG. 3. The screw 58 is then tightened when engaged with the hook member 46 which tends to move the roller 54 in a clockwise direction as shown in FIG. 3 and thereby draw the two portions of the clamp 26 together. At the same time, the screw tightens the roller relative to the upper ear 62 as resistance to further clockwise movement of the roller increases, as the two clamping parts are drawn together. The tendency for the two clamping parts to separate and move the roller in a counterclockwise direction then tends to tighten the roller further. The lower end of the screw maintains the roller vertical during the movement by virtue of the cooperation with the lower opening 68 in the ear 64. Once the roller is adjusted and tightened relative to the bracket 60, it ordinarily needs no further adjustment during use of the tank and dolly. Other means can be used to mount the eccentric roller 54 relative to the bracket 60 but the instant means provides a simple, low cost mounting arrangement which enables adjustment and tightening of the roller to take place at the same time.

The eccentric roller or cam can also be used as the lever pivot pin 36 or the hook pivot pin 50 to adjust the spacing of the clamp. As shown in FIG. 5, an adjustable quick-acting clamp 70 includes a first mounting bracket 72 which is similar to the bracket 60 in that it has an upper threaded hole in the upper ear and a lower non-threaded hole in the lower ear. In this instance, an eccentric roller 74 serves as the pivot pin and is fastened to the bracket 72 by a threaded fastener 76 similar to the arrangement for the roller 54. A slightly modified over-the-center lever 78 has a rolled sleeve portion 80 rotatably mounted around the roller 74 to enable the lever to pivot. A hook member 82 is pivotally connected by a pin 84 to the lever 78 in the same manner as the hook member 46 and the lever 38. The hook member 82 has an end hook 86 which engages an engageable pin 88 suitably held by a second bracket 90.

With the clamp 70, the spacing between the clamp portions of the bracket 72 and 90 can be adjusted by turning the eccentric roller 74 through the threaded fastener 76 in the same manner as in the embodiment of FIG. 3. As the threaded fastener and roller are turned in a counterclockwise direction (assuming left-hand threads), the bracket 72 and 90 will be urged toward one another, with the hook member 82 engaged, to provide the proper adjustment for the clamp.

Another slightly modified clamp 92 is shown in FIG. 6. The clamp 92 includes a first mounting bracket 94 which is similar to the bracket 28 of FIG. 3 and pivotally connects an over-the-center lever 96 by a pivot pin 98. The lever 96 is similar to the lever 38 but has a slightly deeper U-shaped shank 100 to receive an eccentric roller 102 which is mounted between the flanges of the shank 100 by a threaded fastener 104. The fastener 104 can extend through a threaded hole in the upper flange of the U-shape shank and through a non-threaded hole in the lower flange with the passage in the roller again being threaded. A hook or engageable member 106 has a large sleeve portion 108 mounted around the roller 102 and has an end hook 110 engageable with a conventional pin 114 held by a second bracket 116.

The adjustment of the clamp 92 is achieved by turning the roller 102 in the same manner as in FIG. 5 to vary the effective distance between the brackets 94 and 116. The screw or fastener 104 is turned to reduce the distance between the brackets and again tighten the roller relative to the clamping member.

Other modifications of the above-described embodiments of the invention will be apparent to those skilled in the art, and it is to be understood that such modifications can be made without departing from the scope of the invention, if they are within the spirit and the tenor of the accompanying claims.

I claim:
1. In combination, a cylindrical member, a band extending circumferentially of said cylindrical member with ends of said band terminating near one another, and a quick-acting clamp for clamping said band to said cylindrical member, said clamp comprising a first mounting bracket mounted near an end of said band, an engageable pin carried by said bracket, a hook member having an end engageable with said pin, a second mounting bracket mounted near the other end of said band, a lever, a lever pivot pin pivotally connecting said lever to said second mounting bracket, a hook pivot pin connecting said hook member to said lever, one of said pins comprising an eccentric roller having a passage extending longitudinally therethrough, said eccentric roller capable of being rotated about an axis through said passage to urge end portions of said band toward one another or away from one another when said clamp is in clamping engagement.

2. The combination according to claim 1 characterized by a plurality of casters affixed to said band in spaced relationship.

3. The combination according to claim 2 characterized by said large cylindrical member being a vacuum cleaner tank.

4. A quick-acting clamp comprising a first mounting bracket, an engageable pin carried by said bracket, a hook member having an end engageable with said pin, a second mounting bracket, a lever, a lever pivot pin pivotally connecting an end of said lever to said second mounting bracket, a hook pivot pin connecting an end of said hook member to an intermediate portion of said lever, to enable said hook member to engage said engageable pin to provide a clamping engagement, one of said pins comprising an eccentric roller capable of being rotated to change the distance between said brackets when the clamp is in clamping engagement.

5. A clamp according to claim 4 characterized by said eccentric roller having a passage extending longitudinally therethrough, and fastening means received in said passage.

6. A clamp according to claim 5 characterized by said passage being threaded and said fastening means constituting a screw threadedly engaged in said passage.

7. A clamp according to claim 6 characterized by said first mounting bracket and said second mounting bracket each having a pair of flanges, and said lever having a pair of flanges, one flange of one pair of flanges having a threaded opening therein and the other flange of said pair having a non-threaded opening therein, and said screw extends through the first opening, extends through said passage in threaded engagement therewith, and extends into said second opening.

8. A quick-acting clamp comprising a first mounting bracket, an eccentric roller, means mounting said roller on said bracket so that said roller can be rotated relative to said bracket, a hook member having an end engageable with said roller, a second mounting bracket, a lever pivotally connected to said second mounting bracket and to said hook member, to enable said hook member to engage said roller and to urge said brackets toward one another.

9. A quick-acting clamp according to claim 8 wherein said lever is of the over-the-center type and is movable between a clamping position in which said ears are urged toward one another and a release position in which said hook member can be disengaged from said eccentric roller.

References Cited
UNITED STATES PATENTS
| | | | |
|---|---|---|---|
| 2,904,345 | 9/1959 | Bradley | 280—47.13 |
| 2,947,548 | 8/1960 | Bard | 280—79.2 |
| 3,097,410 | 7/1963 | Lincoln | 24—270 |

BENJAMIN HERSH, *Primary Examiner.*

L. D. MORRIS, *Assistant Examiner.*